US009055296B2

(12) United States Patent
Xiang et al.

(10) Patent No.: US 9,055,296 B2
(45) Date of Patent: *Jun. 9, 2015

(54) PROCESSING RASTERIZED DATA

(71) Applicant: MARVELL WORLD TRADE LTD., St. Michael (BB)

(72) Inventors: Shuhua Xiang, Fremont, CA (US); Li Sha, San Jose, CA (US); Ching-Han Tsai, San Jose, CA (US)

(73) Assignee: Marvell World Trade Ltd. (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/928,771

(22) Filed: Jun. 27, 2013

(65) Prior Publication Data

US 2013/0287119 A1    Oct. 31, 2013

Related U.S. Application Data

(63) Continuation of application No. 12/511,238, filed on Jul. 29, 2009, now Pat. No. 8,477,146.

(60) Provisional application No. 61/084,406, filed on Jul. 29, 2008, provisional application No. 61/084,419, filed on Jul. 29, 2008.

(51) Int. Cl.
*G06F 12/10* (2006.01)
*G06T 9/00* (2006.01)
*H04N 19/423* (2014.01)
(Continued)

(52) U.S. Cl.
CPC ....... *H04N 19/423* (2014.11); *H04N 19/00533* (2013.01); *H04N 19/61* (2014.11); *H04N 19/44* (2014.11); *H04N 19/433* (2014.11)

(58) Field of Classification Search
CPC ... G09G 2360/122; G09G 5/39; G09G 5/393; G09G 12/0207; G09G 13/28
USPC .......................... 345/555, 560, 562, 564, 565
See application file for complete search history.

(56) References Cited

U.S. PATENT DOCUMENTS 4,545,069 A    10/1985    Kermisch
5,091,721 A     2/1992    Hamori
(Continued)

FOREIGN PATENT DOCUMENTS

EP    0 849 953 A2    6/1998
WO    99/16252        4/1999
(Continued)

OTHER PUBLICATIONS

United States Patent and Trademark Office (USPTO), Non-Final Office Action issued in U.S. Appl. No. 12/722,654, filed Mar. 12, 2010 having a notification date of Nov. 6, 2012 (10 pgs).
(Continued)

*Primary Examiner* — Hau Nguyen

(57) ABSTRACT

Devices, methods, and other embodiments associated with processing rasterized data are described. In one embodiment, an apparatus includes translation logic for converting lines of rasterized pixel data of a compressed image to a plurality of two-dimensional data blocks. The lines of rasterized pixel data are stored in consecutive memory locations. Each data block is stored in a consecutive memory location. The apparatus includes decompression logic for at least partially decompressing the compressed image based, at least in part, on the two-dimensional data blocks.

20 Claims, 11 Drawing Sheets

(51) Int. Cl.
*H04N 19/44* (2014.01)
*H04N 19/61* (2014.01)
*H04N 19/433* (2014.01)

(56) References Cited

U.S. PATENT DOCUMENTS

| | | | |
|---|---|---|---|
| 5,675,387 | A | 10/1997 | Hoogenboom et al. |
| 5,912,676 | A | 6/1999 | Malladi et al. |
| 6,104,416 | A | 8/2000 | McGuinness |
| 6,208,767 | B1 | 3/2001 | Chapin |
| 6,301,397 | B1 | 10/2001 | Jankowski et al. |
| 6,643,415 | B1 | 11/2003 | Fukai et al. |
| 7,924,296 | B2 | 4/2011 | Guha |
| 2003/0058354 | A1 | 3/2003 | Parulski et al. |
| 2004/0218099 | A1 | 11/2004 | Washington |
| 2004/0223058 | A1 | 11/2004 | Richter et al. |
| 2006/0001905 | A1 | 1/2006 | Utsunomiya |
| 2006/0104543 | A1 | 5/2006 | Schweng |
| 2007/0019005 | A1 | 1/2007 | van Baarsen et al. |
| 2007/0195113 | A1 | 8/2007 | Walton et al. |
| 2008/0029221 | A1 | 2/2008 | Dangami et al. |
| 2008/0219588 | A1 | 9/2008 | Swann |
| 2009/0096813 | A1 | 4/2009 | Nagaraj et al. |
| 2009/0189918 | A1 | 7/2009 | Ollmann |
| 2009/0202168 | A1 | 8/2009 | Watarai |
| 2009/0207101 | A1 | 8/2009 | Noguchi et al. |
| 2011/0110607 | A1 | 5/2011 | Walton et al. |

FOREIGN PATENT DOCUMENTS

| | | |
|---|---|---|
| WO | 02/056600 A1 | 7/2002 |
| WO | 2005/034516 A1 | 4/2005 |

OTHER PUBLICATIONS

Patent Cooperation Treaty (PCT) International Search Report and Written Opinion of the International Searching Authority from PCT International Application No. PCT/US2009/052089, International Filing Date: Jul. 29, 2009, having a mailing date of Dec. 23, 2009.
United States Patent and Trademark Office (USPTO), Non-Final Office Action in pending U.S. Appl. No. 12/722,654, filed Mar. 12, 2010 having a Notification Date of Apr. 16, 2014.
United States Patent and Trademark Office (USPTO), Final Office Action in pending U.S. Appl. No. 12/722,654, filed Mar. 12, 2010 having a Notification Date of Dec. 5, 2013.

300

| P0 | P1 | P2 | P3 | P4 | P5 | P6 | P7 |
|----|----|----|----|----|----|----|----|
| P15 | P14 | P13 | P12 | P11 | P10 | P9 | P8 |
| P16 | P17 | P18 | P19 | P20 | P21 | P22 | P23 |
| P31 | P30 | P29 | P28 | P27 | P26 | P25 | P24 |

| Block (0,0) | Block (0,1) | Block (0,2) | Block (0,3) | Block (0,4) |
|---|---|---|---|---|
| Block (1,0) | Block (1,1) | Block (1,2) | Block (1,3) | Block (1,4) |
| Block (2,0) | Block (2,1) | Block (2,2) | Block (2,3) | Block (2,4) |
| Block (3,0) | Block (3,1) | Block (3,2) | Block (3,3) | Block (3,4) |
| Block (4,0) | Block (4,1) | Block (4,2) | Block (4,3) | Block (4,4) |
| Block (5,0) | Block (5,1) | Block (5,2) | Block (5,3) | Block (5,4) |
| Block (6,0) | Block (6,1) | Block (6,2) | Block (6,3) | Block (6,4) |
| Block (7,0) | Block (7,1) | Block (7,2) | Block (7,3) | Block (7,4) |
| Block (8,0) | Block (8,1) | Block (8,2) | Block (8,3) | Block (8,4) |
| Block (9,0) | Block (9,1) | Block (9,2) | Block (9,3) | Block (9,4) |

Figure 5

PROCESSING RASTERIZED DATA

CROSS REFERENCE TO RELATED APPLICATIONS

This disclosure is a continuation of U.S. application Ser. No. 12/511,238 filed on Jul. 29, 2009, now U.S. Pat. No. 8,477,146, which claims benefit under 35 USC §119(e) to U.S. provisional application Ser. No. 61/084,406, filed on Jul. 29, 2008, and U.S. provisional application Ser. No. 61/084,419, filed on Jul. 29, 2008, which are hereby incorporated by reference.

BACKGROUND

Video compression is used in a variety of products. Video compression is used in digital television set-top boxes, digital satellite systems, high definition television (HDTV) decoders, digital versatile disk (DVD) players, video conferencing, and other digital video applications. Video compression allows an image of video content to be compressed by removing non-essential features of the video content. Compressing video content reduces the storage area needed to store the video content. Compressed video content may be transmitted faster than un-compressed video content because compressed video content contains less data than uncompressed video content.

Video compression/decompression algorithms perform several operations on an image of video content when compressing or decompressing the image. For example, one step in the compression may include transforming the image from a spatial domain to a frequency domain using a discrete cosine transform. The image is then quantized and encoded to reduce the amount of data needed to represent the image. However, encoding reduces the precision of the image. The image can be encoded using variable length decoding. Variable length decoding uses more bits to encode less commonly occurring symbols than are used to represent more commonly occurring symbols. Symbols are representations of bit values of the image. A decoder can recreate the image by performing steps similar to the encoding process in reverse. A better way of encoding and/or decoding images may be desirable.

SUMMARY

In one embodiment, an apparatus is provided. The apparatus includes translation logic for converting lines of rasterized pixel data of a compressed image to a plurality of two-dimensional data blocks. The lines of rasterized pixel data are stored in consecutive memory locations. Each data block is stored in a consecutive memory location. The apparatus includes decompression logic for at least partially decompressing the compressed image based, at least in part, on the two-dimensional blocks.

In one embodiment, the decompression logic is configured to at least partially decompress the image by obtaining a motion vector. The motion vector is obtained based, at least in part, on one or more of the two-dimensional data blocks. The decompression logic is configured to compensate for motion between two frames of the image based, at least in part, on the motion vector.

In one embodiment, the translation logic is configured to combine two or more two-dimensional data blocks into one page of memory with adjacent back-to-back memory addresses.

In one embodiment, an apparatus includes mapping logic to remap addresses of raster lines of an image of pixel data to a plurality of tile blocks. One tile block is a two-dimensional block that contains pixels from multiple raster lines. The apparatus includes image processing logic to at least partially decode or encode the image based, at least in part, on the plurality of tile blocks.

In one embodiment, the image processing logic is configured to obtain at least one motion vector for the image. The motion vector is obtained based, at least in part, on one or more of the plurality of tile blocks. The image processing logic is configured to encode or decode the image based, at least in part, on the at least one motion vector.

In another embodiment, the mapping logic is configured to map the plurality of tile blocks into a grid of non-overlapping tile blocks. One of the raster lines of an image of pixel data is at least partially represented by two or more tile blocks.

In one embodiment, a method is provided. The method transforms, in a memory, lines of rasterized data of an image into tiles of data. The transforming includes mapping addresses of pixels contained in one tile of data to continuous memory addresses. The one tile of data is defined to include pixels from two or more raster lines of data. The method decodes the image using the image data in a format of the tiles of data to generate a decoded image.

In one embodiment, the decoding further comprises obtaining a motion vector and controlling the decoding of the image. The motion vector is obtained based, at least in part, on one or more of the tiles of data. The controlling of the decoding of the image is based, at least in part, on the motion vector.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3 illustrates an embodiment of an 8×4 data block associated with a data block.

FIG. 5 illustrates an embodiment of portions of pages of tiled memory associated with data blocks.

DETAILED DESCRIPTION

Figure 1:
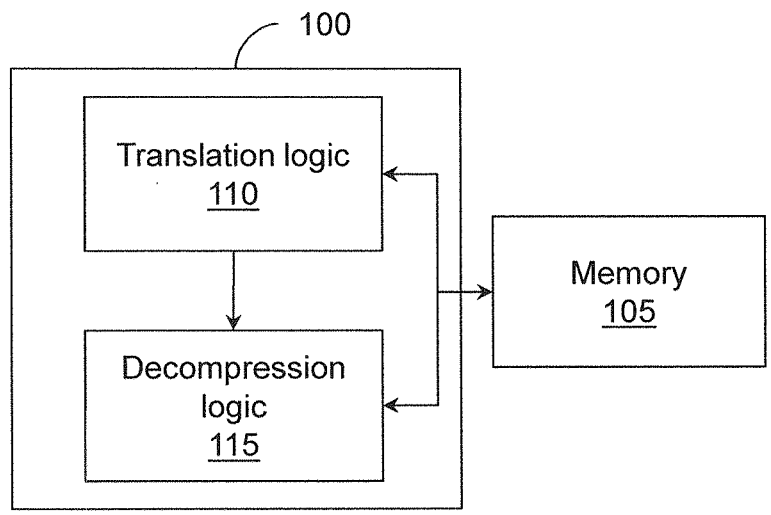
FIG. 1 illustrates an embodiment of an apparatus associated with processing rasterized pixel data into data blocks.

Described herein are example systems, methods, and other embodiments associated with processing rasterized data. In one embodiment, rasterized pixel data is processed as data blocks also referred to herein as tiled image data. Prior to discussing the present systems, consider the following example of how image data may be stored. Image data representing a frame of an image is stored as rasterized data. Rasterized data is represented as lines of pixels (e.g., horizontal lines) that are organized in parallel. For example, one line of pixels equates to one line of data across the width of the image. A string of horizontal pixels is stored in consecutive memory locations (e.g. a string of back-to-back adjacent memory addresses). For example, if one line of image pixels contains 1000 pixels, then a rasterized representation of the pixels would be stored in a 1000 consecutive memory address locations (e.g. 0 through 999, or other consecutive group of addresses).

In contrast to representing pixels of an image as rasterized data, one embodiment of an apparatus is configured to represent image data as data blocks. A data block is a two-dimensional portion of the image. For example, a frame of an image may be tiled into a grid of non-overlapping two-dimensional 4×4 blocks. Where the image is initially represented as rasterized lines stored in back-to-back adjacent addresses as discussed above, the data from a 4×4 block is not in consecutive address locations because the block spans multiple lines. The apparatus re-organizes the data so that the pixel data of a 4×4 block is stored in consecutive back-to-back addresses. This will be described in more detail below.

Some image decompression algorithms operate on two-dimensional macro-blocks (MBs) of data rather than rasterized lines of data. The decompression of an image can be improved by using blocks of tiled image data as described herein rather than using rasterized lines of data. For example, consider a memory request for a 4×4 MB that is from rasterized data. When the 4×4 MB is retrieved from memory, at least four separate memory requests are needed because the 4×4 MB spans four raster lines of data and hence four different memory locations. If a dynamic random access memory (DRAM) requires 32 bytes of aligned data to be read in one memory transaction, then 32×4=128 bytes of data are read in order to retrieve one 4×4 MB of data.

By comparison, the 4×4 MB may be retrieved faster when the data representing the image is stored as two-dimensional data blocks as discussed herein. One data block (also referred to a one two-dimensional tile of data) may represent an 8×4 portion of the image and correspond to 32 bytes of aligned DRAM data. When image data is stored as data blocks, a 4=4 MB of data can be retrieved in a single 32 byte memory access. In general, organizing and processing pixels represented as data blocks improves the processing of image data.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored on a computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an apparatus 100 configured to process image data. The apparatus 100 operates on image data stored in a memory 105. The memory 105 may be a dynamic random access memory (DRAM) that accesses 32 bytes of data in one memory transaction. The memory 105 may be other kinds of memory.

The apparatus 100 may receive a stream of image data, at least partially decompress the image data, and store the image data in the memory 105 as two-dimensional data blocks. As previously stated, data blocks may also be referred to as tiled data or blocks of tiled data. Image compression and decompression algorithms often operate on two-dimensional macro-blocks (MBs) of data. As discussed below, it may be more efficient to operate on two-dimensional representations of data rather than one-dimensional lines of rasterized data. Even though the apparatus 100 is discussed below as decompressing image data, in other embodiments the apparatus 100 may process data blocks to compress image data.

In one embodiment, the apparatus 100 includes translation logic 110 that functions to convert lines of rasterized pixel data of an image (e.g. compressed or uncompressed) to a two-dimensional data structure. As previously explained, the lines of rasterized pixel data are stored in consecutive memory locations. One line of rasterized data is considered a one-dimensional array. The lines are converted to a plurality of two-dimensional data blocks where each data block is stored in a consecutive memory location. For example, memory addresses from the raster format are translated to a tiled block format (and vice versa). In another embodiment, parallel lines of rasterized pixel data are converted into two-dimensional data blocks. One data block contains pixel data from at least two different parallel lines of the rasterized pixel data. As stated above, a line of rasterized data represents one line of the image across its width, for example. The translation logic 110 assigns the pixel data from one data block to a continuous address space where previously it was not continuous in memory. Thus the image data is re-organized in the stored memory as two-dimensional data blocks.

Figure 2:
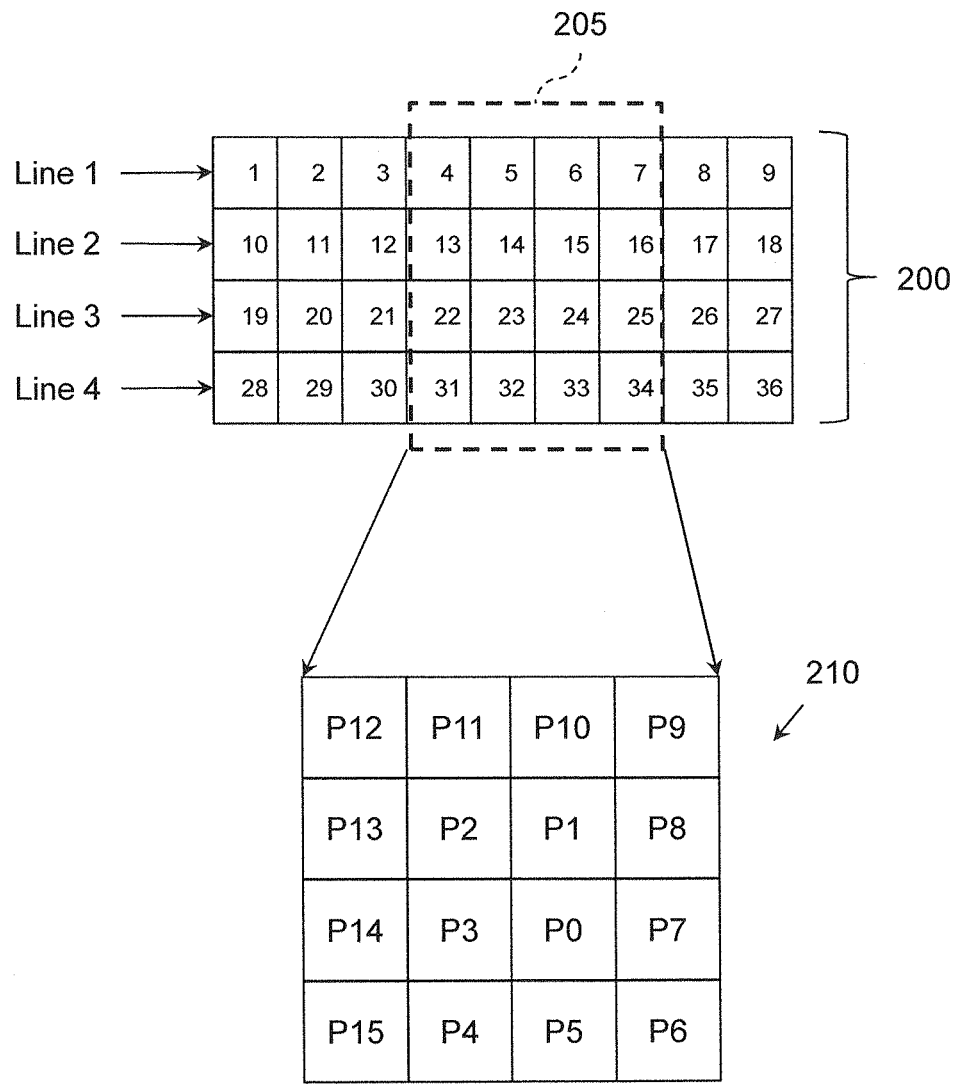
FIG. 2 illustrates an embodiment of a 4×4 data block associated with a data block.

For example, FIG. 2 illustrates one example of converting or otherwise re-organizing pixel data. Suppose block 200 illustrates four lines of rasterized data line 1, line 2, line 3, and line 4. Each line contains 9 pixels. Of course, actual image data is formed from numerous raster lines and numerous pixels per line. Suppose pixels 1-36 are stored in memory locations 1-36 as they appear in the lines. The apparatus 100 re-organizes the data into two-dimensional data blocks (e.g. tiled blocks). Suppose 4×4 blocks are selected for implementation. One example 4×4 block is designated as block 205. Block 205 includes pixels from four different lines and thus its pixels are found in the memory in four discontinuous locations (e.g. locations 4-7, 13-16, 22-25, and 31-34). The selected block is re-organized so that its pixels are stored/mapped in a continuous section of memory as shown by the example data block 210. In one embodiment, the re-organization is performed using a mapping table that translates the addresses between the raster line format to the two-dimensional data block format.

In data block 210, the pixels P0-P15 are stored in (or mapped to) sixteen consecutive memory locations in a sequential order starting with P0 to P15. In the illustrated example, the pixels are ordered in a spiraling shape from pixel P0 but any sequential order may be used. The consecutive memory locations may be for example, back-to-back locations or otherwise adjacent locations. The remaining rasterized lines may also be tiled into similar blocks throughout the image data.

The resulting two-dimensional data block becomes more efficient to access for certain types of memories and/or for certain types of compression/decompression algorithms. In one embodiment, the memory 105 (of FIG. 1) may be a DRAM memory that uses one memory transaction (e.g., a write or a read) to access 32 sequential memory addresses. For example, even if one byte of data is requested from the memory 105, the memory 105 will access 32 adjacent bytes of data. Because the sixteen pixels P0-P15 of the 4×4 data block 210 are stored in sequential memory addresses, the sixteen pixels may be read out of the memory 105 in one memory transaction. As discussed below, more than one memory transaction may be needed if the size of a data block spans more than one sequence of 32 sequential memory addresses.

With reference again to FIG. 1, the apparatus 100 includes decompression logic 115. The decompression logic 115 at least partially decompresses a compressed image based, at least in part, on the two-dimensional data blocks (e.g. by processing the data in groups defined by the data blocks). In one embodiment, the decompression logic 115 at least partially decompresses the compressed image by obtaining a motion vector. The motion vector is based, at least in part, on the two-dimensional data blocks. The decompression logic 115 compensates for motion between the current image being processed and another adjacent image based, at least in part, on the motion vector.

Because a rasterized line of pixels may comprise hundreds or thousands of pixels, a line of rasterized pixel data is represented by at least two two-dimensional data blocks. For an actual image, there will likely be hundreds or thousands of defined data blocks. Also, the sequential back-to-back memory addresses may be assigned to a data block in different ways. For example, pixel P0 of FIG. 2 represents a center pixel. Pixels P0, P1, P2, P3, and so on represent a spiral series of back-to-back adjacent pixels that begin at the center pixel and spiral out-and-around the center pixel. The spiral series of back-to-back adjacent pixels is a sequential string of continuous addresses. For example, P0 may map to address A0, P1 may map to adjacent address A1, P2 may map to adjacent address A2, and so on.

With reference to FIG. 3, another embodiment of a data block is shown. The data block is shown as an 8×4 pixel block 300. As seen by the pixel numbers assignments (P0, P1, etc), sequential back-to-back memory addresses may be assigned to the block 300 in a back and forth zigzag pattern (see sequential pixel numbers 0-31). For example, pixels P0 to P7 from left to right may be assigned to adjacent addresses A0 to A7, while pixels P8 to P15 from right to left may be assigned to adjacent addresses A8 to A15, and so on. In another embodiment, the order of assigning addresses in the block 300 may not be important as long as the pixels of the block are assigned to a continuous section of addresses.

Figure 4:
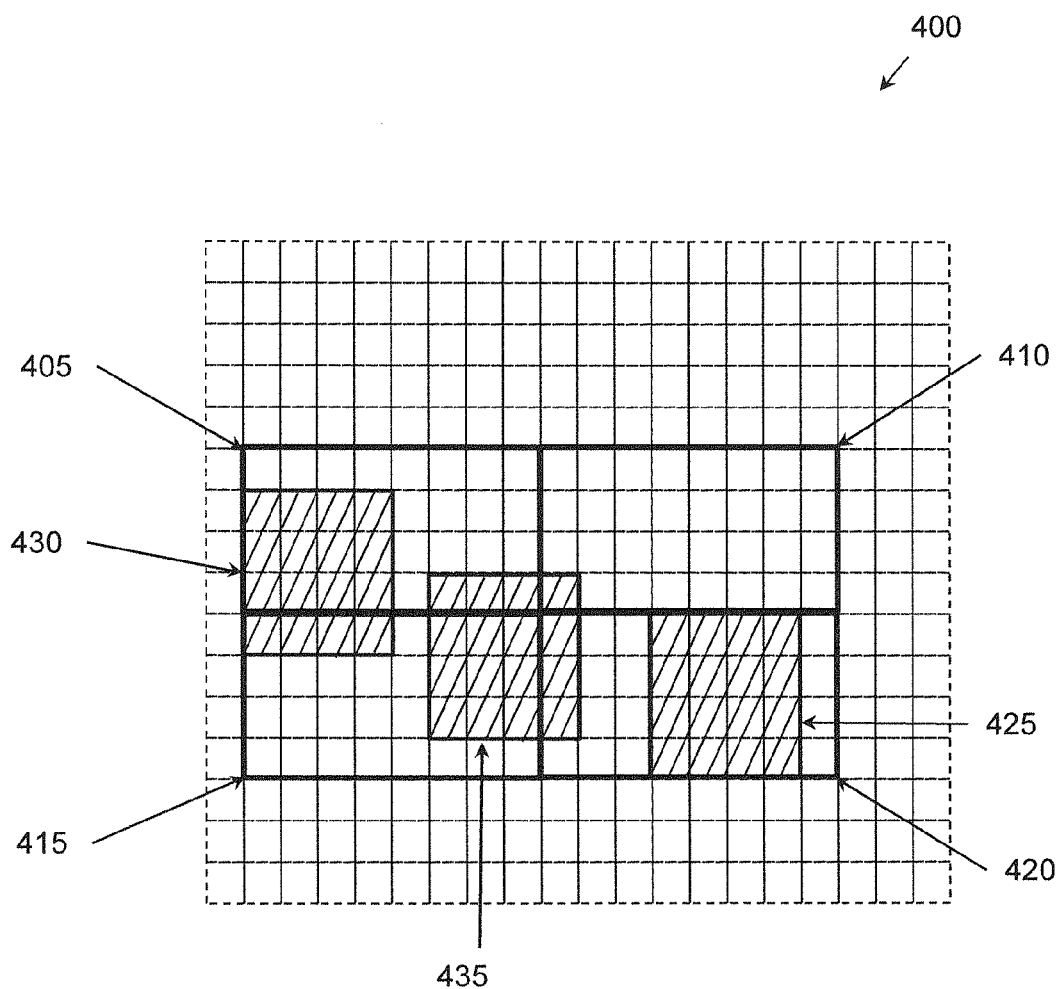
FIG. 4 illustrates an embodiment of a portion of an array of pixels associated with a data block.

As previously stated, operating on two-dimensional data blocks is more efficient than operating on lines of rasterized data when a compression/decompression algorithm is configured to operate on two-dimensional macro-blocks (MBs) of data. For example if 32 bytes of an 8×4 data block are read from the DRAM memory, a 4×4 MB data may reside in a single 8×4 data block. FIG. 4 shows a portion of an example array of pixels 400 (shown a dashed line squares) of an image. Four 8×4 data blocks 405, 410, 415, and 420 are highlighted in bold lines. When using 4×4 MB tiles, sometimes a 4×4 MB will reside completely within one of the 8×4 blocks (e.g. 4×4 block 425) and sometimes only a portion will be within a block (e.g. 4×4 blocks 430 and 435). If the 4×4 MB 425 resides in one data block, then one memory transaction accesses the entire 8×4 block 420 and thus the entire 4×4 block 420 in a single memory transaction.

If 4×4 MB 430 spans two 8×4 data blocks 405 and 415, then two 8×4 data blocks 405, 415 are read in order to retrieve the 4×4 MB 430. In this case, two 32 byte DRAM memory accesses return 16 bytes of the desired data block and 48 bytes of other data. Performing two DRAM memory accesses is more efficient that performing four raster line memory accesses, which would return 16 bytes of the desired data block and 96 bytes of other data.

In some cases, a 4×4 block may span multiple 8×4 blocks (e.g. 4×4 block 435 is part of four 8×4 data blocks 405, 410, 415, and 420). In these cases, four 8×4 data blocks 405, 410, 415, 420 are read from the DRAM.

The concept of creating two-dimensional data blocks that may be read as a single memory transaction can be extended to combining adjacent data blocks. The adjacent data blocks may be combined so that the adjacent data blocks do not span more than one page of memory. For example, a DRAM memory may be organized into 1K pages (e.g., 1024 bytes) of memory. For a 1K page of memory, 1024/32=32 tiles of 8×4 data blocks may be combined into a page of tiled memory. The page of tiled memory representing a page of memory is assigned to a continuous range of back-to-back memory addresses that is a continuous collinear range of addresses. FIG. 5 shows an example of how 32 data blocks [data block (0, 0) through data block (7, 3)] of a portion of an image 500 may be combined into a 1K page of data blocks. The page of data blocks may also be referred to as a page of tiled data.

Memory transactions may be made more efficient when adjacent two-dimensional data blocks of memory are combined into a page of data blocks representing a same page of memory. This is due to the rule of spatial locality, which predicts that pixels near recently used pixels are likely to be accessed soon after prior adjacent pixels have been accessed.

With reference again to FIG. 1, in one embodiment, the page of data blocks may be an array of two-dimensional data blocks. The translation logic 110 combines four or more two-dimensional data blocks into a two-dimensional array of two-dimensional data blocks. Two-dimensional data blocks are arrayed in one direction and two-dimensional data blocks are arrayed in another direction. The translation logic 110 stores the two-dimensional array into the memory 105 in the same page of memory.

The apparatus 100 may contain other components and implement other features. For example, in one embodiment, the apparatus 100 may be implemented with memory access logic to store one two-dimensional block of data into the memory in a single memory transaction. The memory access logic can also read two-dimensional data blocks from the memory 105 as part of one memory transaction.

Figure 6:
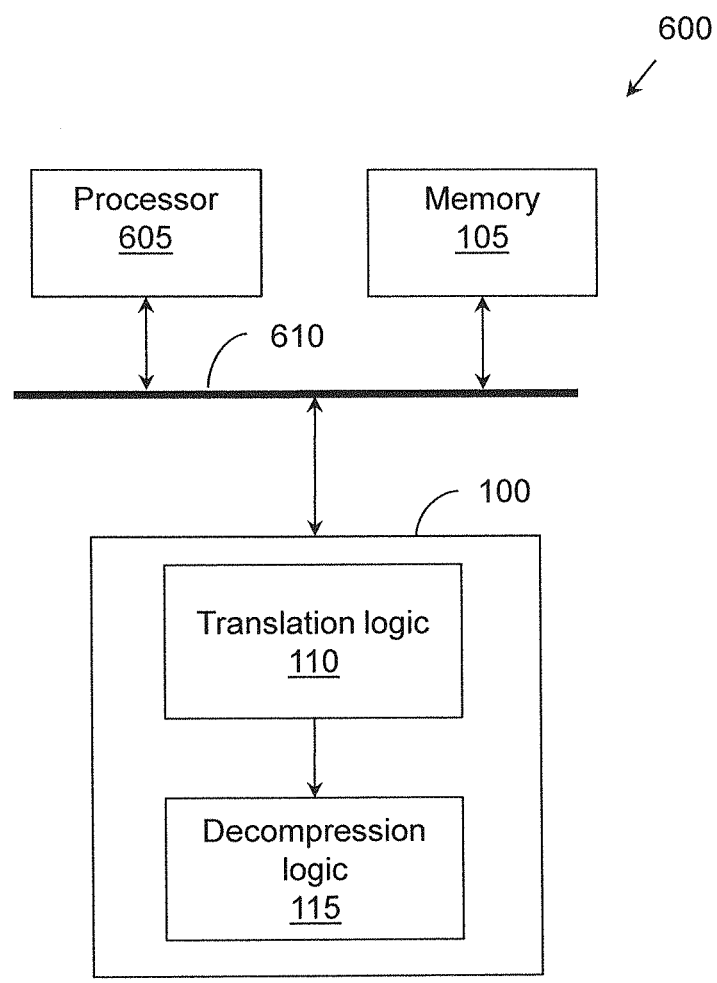
FIG. 6 illustrates an embodiment of a system on a chip.

In another embodiment, as shown in FIG. 6, the apparatus 100 of FIG. 1 is implemented as part of a system 600 and includes processor 605. The system 600 may be a system on a chip that includes transistor logic, but other circuits are also possible. The processor 605, the memory 105 (shown in FIG. 1), and a bus 610 may be included in the system on a chip. The apparatus 100 may interface with the memory 105 through the bus 610.

Figure 7:
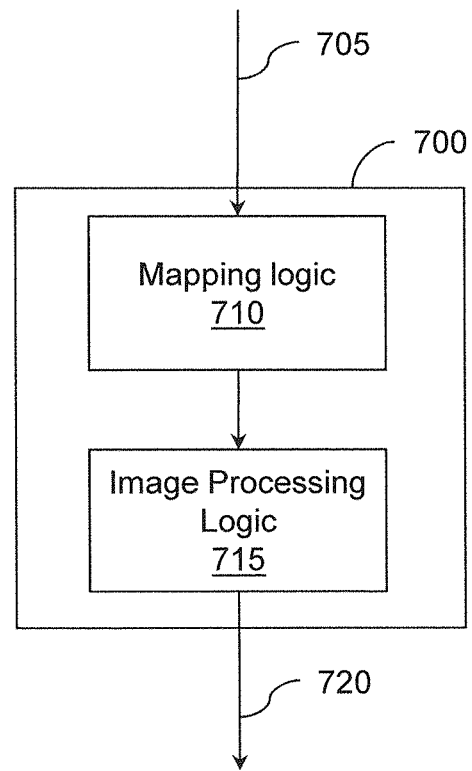
FIG. 7 illustrates another embodiment of an apparatus associated with processing data blocks.

FIG. 7 illustrates one embodiment of an apparatus 700 that functions to compress and/or decompress an image using tiled image data blocks rather than lines of rasterized image data. The tiled image data may be two-dimensional image data as discussed above or equivalents thereof.

The apparatus 700 includes an input channel 705 to receive raster lines of image data. In general, the raster lines of image data are consecutive horizontal rows of pixels. An image may be formed from many horizontal rows of pixels. Addresses associated with one row of pixels are assigned in a continuous string of back-to-back addresses that store corresponding adjacent pixels. In one example, the end of one raster line continues at the beginning of the next raster line (e.g. the right most address of the right most pixel of a raster line is adjacent to the address of the left most pixel of a next raster line of pixels).

The apparatus 700 includes mapping logic 710 and image processing logic 715. The mapping logic 710 functions to remap addresses of pixels from the raster lines to tile blocks. In one embodiment, the tile blocks are similar to the data blocks/blocks of tiled data discussed earlier. The tile blocks represent an array of pixel data. For example, the tile blocks may represent two-dimensional rectangle areas of the image. The image may be represented by a grid of non-overlapping tile blocks. A tile block represents at least two pixels in one direction (horizontal) and at least two pixels in a different direction (vertical). A raster line that has been mapped will be represented by two or more tile blocks because a tile block has a shorter width than a raster line of image data. In one embodiment, a tile block may be implemented with a size of a macro-block (MB) of data or to represent at least a portion of a macro-block of data.

In one embodiment, the image processing logic 715 functions to at least partially decompress (or compress) the image based, at least in part, on the tile blocks. Thus, the data is processed in groups defined by the tile blocks. In one example, the image processing logic 715 is configured to obtain at least one motion vector for the image based, at least in part, on some of the tile blocks. The image processing logic 715 then compresses the image based, at least in part, on the motion vector. In another embodiment, the image processing logic 715 may process the image using tile blocks according to the H.264 standard or another standard as appropriate. The apparatus 700 can write the decompressed (or compressed) image to a memory and/or output the decompressed or compressed image to an output channel 720.

In one embodiment, the mapping logic 710 maps addresses of raster lines to tile blocks so that a tile block can be written into a memory in one memory transaction. For example, if a dynamic random access memory (DRAM) reads or writes data in 32 byte blocks, then the mapping logic 710 creates tile blocks with a size of 32 bytes. The apparatus 700 can then write or read one tile block to a memory in one memory transaction.

In one embodiment, the mapping logic 710 groups blocks that are adjacent to one another into a group of tile blocks. A group of tile blocks may correspond to a page of DRAM or another memory. Data accessed from a single page of memory is accessed faster than data that spans multiple pages of memory. This is because a DRAM closes a first page of memory and then opens a second page of memory when a memory access spans two pages of memory. The apparatus 700 can then write or read the group of tile blocks corresponding to a page of memory without the memory opening or closing other pages of memory, which would incur additional access time.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ other blocks not illustrated.

Figure 8:
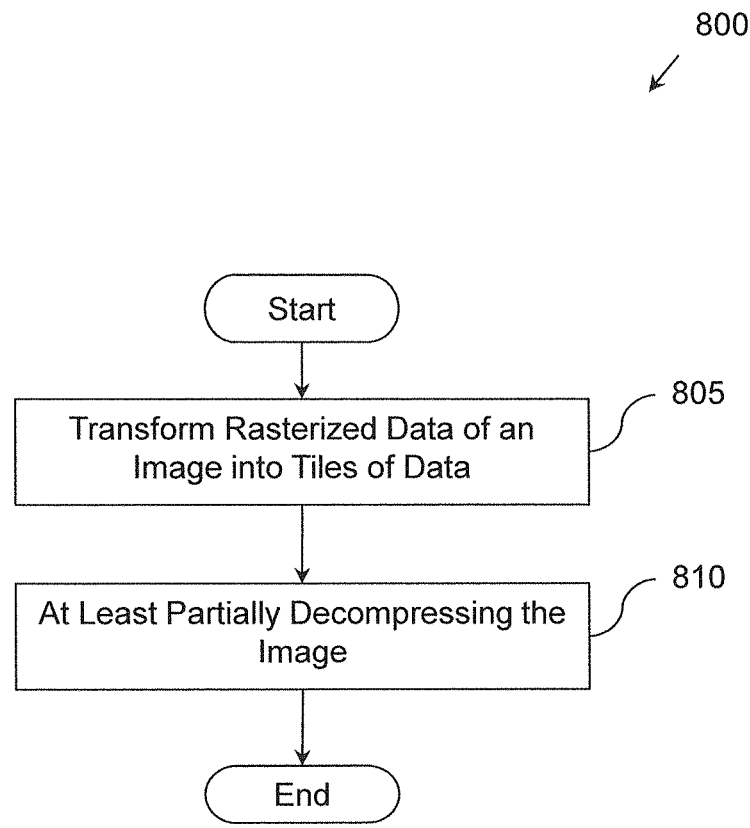
FIG. 8 illustrates an embodiment of a method associated with processing data.

FIG. 8 illustrates an embodiment of a method 800 associated with processing image data of an image. This may include decompressing and/or compressing the image. The method 800 may improve the efficiency of processing because tiles of data are used to represent portions of an image rather than raster lines of data. In one embodiment, the tiles of data are similar to the two-dimensional data blocks as discussed above. The tiles of data may be two-dimensional tiles of data that represent rectangular portions of the image.

The method 800 transforms, at 805, lines of rasterized data of an image into tiles of data. In one example, this includes re-mapping addresses of pixels from the rasterized data to form tiled blocks. As previously explained, rasterized data is represented in a form of parallel raster lines of data. A raster line of data is a line of pixels assigned to a continuous string memory addresses. A tile of data is defined as a two dimensional array of adjacent pixels. Because a tile of data is two-dimensional, the tile includes pixels from two or more raster lines of data. One raster line is regarded as a one dimensional object.

At 810, the image is at least partially decompressed (or compressed) based, at least in part, on the tiles of data rather than using the raster lines of data. Thus the decoding is performed by using the image data in a format of the tiles of data to generate a decoded image. The image can be stored in memory. In one embodiment, a motion vector is obtained based, at least in part, on the tiles of data. The motion vector is obtained based, at least in part, on the movement of an object that appears in two different frames of the image. The movement is determined by comparing a movement of the object in adjacent frames of the image (e.g. compare position/location of object from frame-to-frame). A two-dimensional rectangular region of the object may be used to determine the movement. The entire image or entire raster lines of an image are not necessarily needed. In one example, the object may be identified to appear in one tile of data or a few adjacent tiles. Because one or a few tiles are less than entire raster lines of data, it is more efficient to operate on tiles of data rather than raster lines of data when obtaining a motion vector. After the motion vector is obtained, the decoding of the image is controlled based, at least in part, on the motion vector.

In one embodiment, the transformation of rasterized data, at 805, is performed so the addresses of pixels represented by one tile of data are mapped to a continuous string of adjacent memory addresses.

Furthermore, the tiles of data can be arranged as a grid of adjacent non-overlapping tiles. The tiles of data are located in the grid corresponding to where a portion of the image represented by the tile is located in the image. Within the grid of data, addresses of one tile of data are continuous with at least one adjacent tile of data. For example, if one tile of data is represented by pixels stored at addresses 128 to 159, then an adjacent tile of data is represented by pixels stored at addresses 160 to 191, and so on.

In another embodiment, the grid of data representing an image may be partitioned into adjacent pages of tiles. A page of tiles contains adjacent tiles of data that are stored to one page of memory. Thus a page of tiles may be accessed within one page of DRAM memory without accessing other pages of DRAM memory. Thus, a tile of data in the page of tiles is written to or read from the DRAM in one memory transaction. Accessing one page of memory is more efficient than accessing multiple pages of memory. For example, multiple accesses use more time. When a second page of memory is accessed, a page of memory needs to be closed by the DRAM before another page of memory can be opened.

In one embodiment, the method 800 may be implemented in a system on a chip (SoC). The SoC may include a processor, a bus, and an image compression/decompression engine. The processor may generate commands for decoding the image and send the commands over the bus to the compression/decompression engine. In one embodiment, the commands at least partially control the decoding at 810. The commands may at least partially control how the compression/decompression engine decodes the image, at 810.

It will be appreciated that in one embodiment, the methods herein may be implemented as computer executable instructions embodied and stored on a computer-readable medium. When executed by a machine (e.g., processor, device, computer, chip, etc.), the instructions cause the machine to perform the methods herein or their equivalents. The methods may be implemented in a semiconductor memory chip. The methods can also be implemented with circuits.

Figure 9:
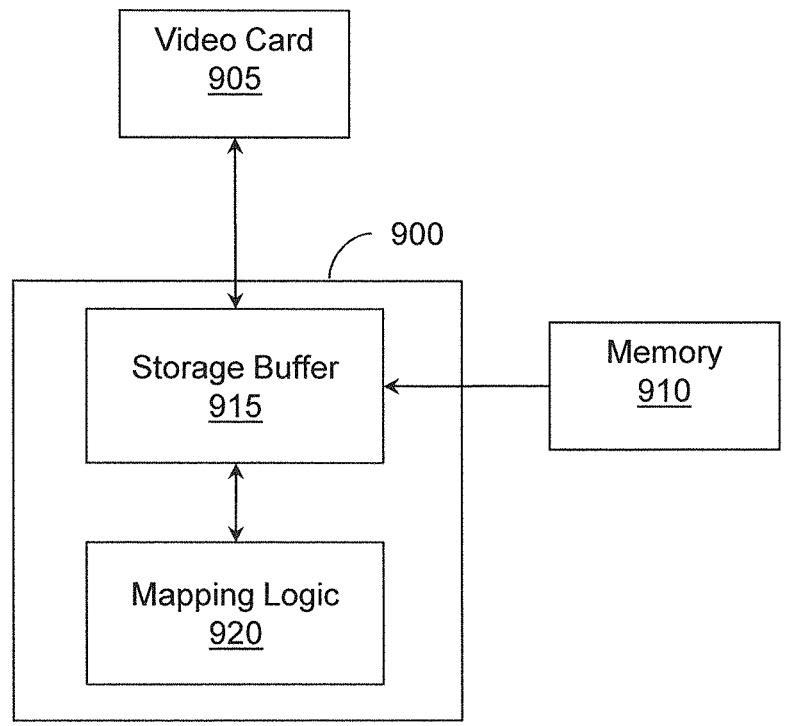
FIG. 9 illustrates another embodiment of an apparatus associated with processing data.

FIG. 9 illustrates one embodiment of a local queue 900 configured to buffer and convert two-dimensional tiled image data into a raster-scan order. The local queue 900 can be a permutation buffer object (PBO). In one example, the tiled image data has a form as discussed above that was initially created from raster lines of data. Some image processing devices or display devices require image data to be in lines of rasterized data. Thus these devices cannot recognize tiled blocks of data. Display devices display rasterized pixel data line-by-line in sequential pixel address order and in sequential line order.

The local queue 900 acts as a converter or translator to convert tiled image data into lines of rasterized data. For example, the local queue 900 can interface between a video card 905 and a memory 910 containing tiled image data. In one embodiment, the local queue 900 may be connected to the video card 905 via an advanced high-performance bus (AHB) and may be connected to the memory 910 via another AHB bus. Of course, other types of busses or other connections can be used to connect the local buffer 900 to the video card 905 and the memory 910. The memory 910 may be a frame buffer that stores frames of an image that has been decompressed.

The local queue 900 includes a storage buffer 915 and mapping logic 920. The storage buffer 915 is a holding place for multiple blocks of tiled image data. The local queue 900 retrieves multiple blocks of tiled image data representing a line of rasterized pixel data from the memory 910 and stores the tiled image data in the storage buffer 915.

As discussed above, memory may be efficiently accessed using aligned 32 byte blocks. Therefore, the tiled image data may be 8×4 blocks of pixel data. The storage buffer 915 can store data representing four raster lines of pixels in a buffer that is four entries deep. One line of the storage buffer 915 may be 2K (2048 bytes) in size, resulting in a storage buffer size of 8K. In this example, when the video card 905 requests 32 bytes of rasterized line data, the local buffer 900 requests four blocks of tiled image data from the memory. This is because one block is 8×4 and one memory access returns eight bytes (e.g., 8×1 bytes) of data representing eight pixels of the rasterized line of data and 24 bytes corresponding to three other rasterized lines of data. Three more blocks are retrieved in order for the local buffer 900 to return the complete 32 bytes of rasterized line data. Of course, when one of the three lines below the first line of 32 bytes of rasterized data is requested, that data can be returned from the local buffer 900 because it was already fetched as part of the four blocks of 8×4 pixel data.

The storage buffer 915 may generate bursty memory traffic because when one rasterized line of data is requested, the buffer reads four 8×4 blocks of tiled image data representing four rasterized lines of data. Because 8×4 blocks of tiled image data are read, portions of four rasterized lines of data are read. A portion of one rasterized line of data is initially requested and the other lines of data are read (e.g., pre-fetched) before they are requested. The burstiness may be reduced by using double buffering. Double buffering adds a second 8K buffer to even out the pre-fetching. However, the storage buffer 915 is now 16 K bytes (8K+8K) in size.

In one embodiment, if pre-fetched data can be placed anywhere in the storage buffer 915, then the next 32 bytes of data can be pre-fetched as soon as 32 bytes of data are free in the storage buffer 915. This allows for pre-fetching without requiring a second 8K double buffer. However, a line in the storage buffer 915 may no longer directly represent a rasterized line of data. This is because 32 byte sections of a rasterized line of data are not stored back-to-back in one of the lines of the storage buffer 915. Instead, eight byte portions of the rasterized line of data can be located in different lines of the storage buffer 915.

The mapping logic 920, for example, maps the location of a pixel address to a data location in the storage buffer 915. The mapping logic 920 may have 256×4 entries for an 8K storage buffer 915 when one table entry represents one 8×1 row of a block of tiled image data. Therefore, when a request for 32 bytes of rasterized image data is received, the local buffer 900 instructs the storage buffer 920 to lookup four locations corresponding to four 8×1 rows of pixels associated with the 32 bytes requested. The 32 bytes of rasterized image data may be returned from those four locations.

Figure 10:
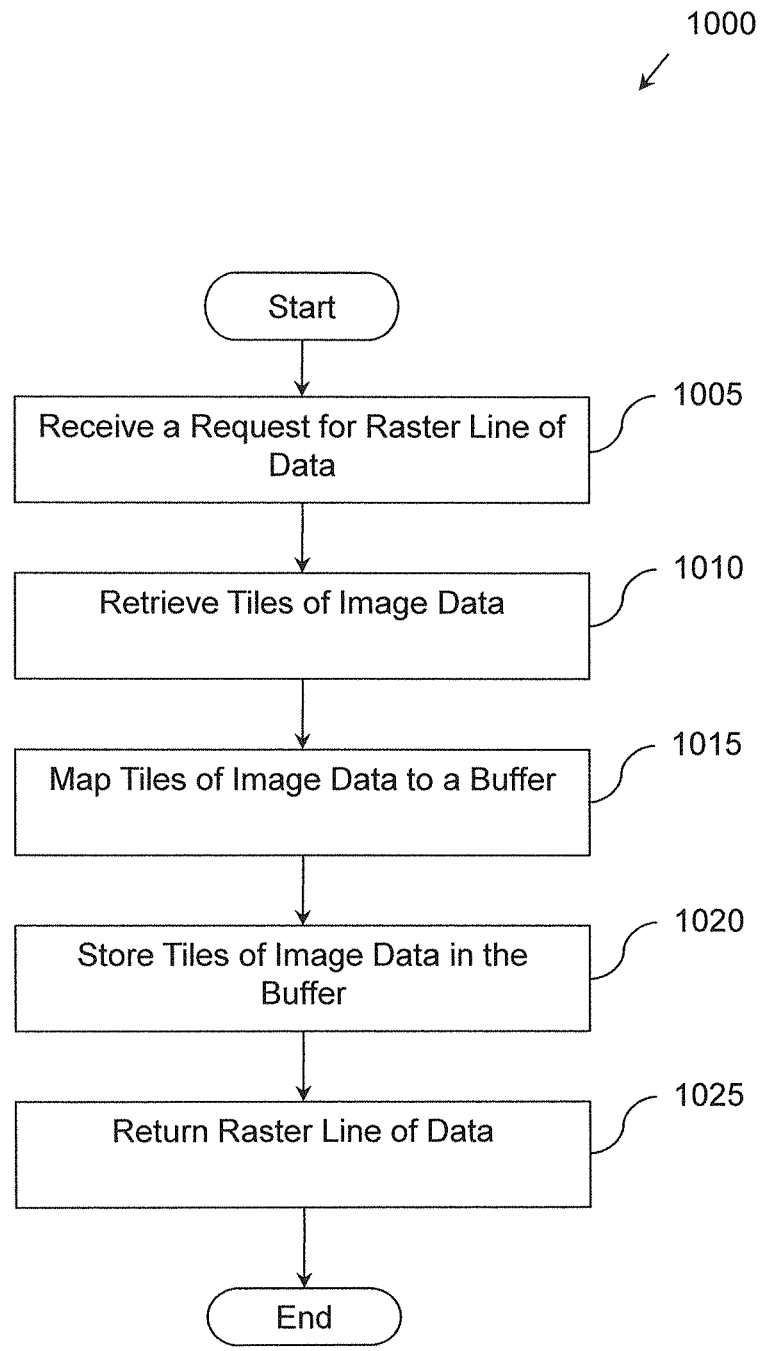
FIG. 10 illustrates another embodiment of a method associated with processing data.

FIG. 10 illustrates another embodiment of a method for converting tiles of data into raster lines of data. Some compression/decompression engines operate more efficiently on tiled data than raster lines of data. Devices such as image display devices operate more efficiently on raster lines of data than on tiles of data. The method may act as a bridge for converting tiles of data into raster lines of data for display devices (and vice versa).

A request for a raster line of data is received, at 1005. The request may be for a portion of a raster line of data that has a certain size (e.g. 2048 bytes (2K) long). The raster line of data is a line of data that represents back-to-back pixels of data.

Since the image data is mapped as blocks of tiles as in previous examples, tiles of image data are retrieved, at 1010. In one example, the tiles of data are organized as 8×4 tiles of image data. The tiles of image data are mapped to a buffer, at 1015. It will be appreciated that an 8×4 block is formed of four 8×1 blocks. The four 8×1 blocks of image data may be mapped to different locations in the buffer. A lookup table may be used to map 8×1 blocks of image data to the buffer.

After the tiles of image data are mapped, the tiles are stored, at 1020, to the buffer according to the mapping, at 1015. The raster line of data is returned, at 1025, to the requester of the line of raster data. In one embodiment, 32 bytes of data are returned when they are available.

Figure 11:
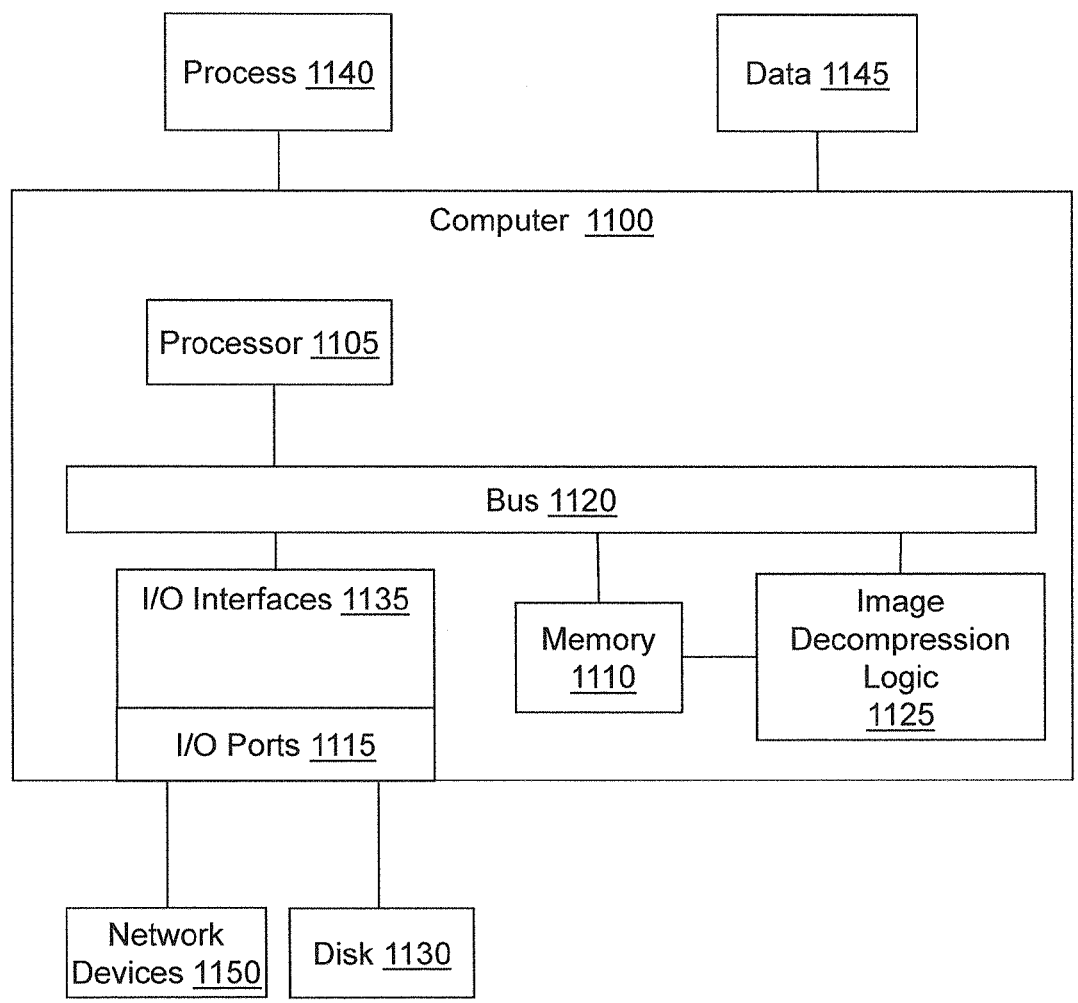
FIG. 11 illustrates an embodiment of a computing environment in which example systems, methods, and equivalents associated with processing data blocks may operate.

FIG. 11 illustrates an example computer 1100 in which example systems and methods described herein, and/or equivalents, may be implemented. The example computer 1100 includes a processor 1105, a memory 1110, and input/output ports 1115 operably connected by a bus 1120. In one example, the computer 1100 is implemented with image decompression logic 1125.

The image decompression logic 1125 provides means (e.g., hardware, stored software, and firmware) to decompress compressed image data. In another embodiment, the image decompression logic 1125 may include image compression logic to compress image data. The image decompression logic 1125 can be implemented similar to apparatuses 100 and 700 of FIGS. 1 and 7 and/or a combination of the features described herein or their equivalents. The image decompression logic 1125 can include logic implemented, for example, as an ASIC or other type of circuit.

Generally describing an example configuration of the computer 1100, the processor 1105 may be a variety of various processors including single, dual microprocessor, and other multi-processor architectures. A memory 1110 may include volatile memory and/or non-volatile memory. Non-volatile memory may include, for example, read-only memory (ROM), programmable read only memory (PROM), erasable programmable read only memory (EPROM), phase change memory (PCM), electronically erasable programmable read only memory (EEPROM), and so on. Volatile memory may include, for example, random access memory (RAM), static random access memory (SRAM), dynamic random access memory (DRAM), and so on.

A disk 1130 may be operably connected to the computer 1100 via, for example, through an input/output interface (e.g., card, device) 1135 and the input/output port 1115. The disk 1130 may be, for example, a magnetic disk drive, a solid state disk drive, a floppy disk drive, a tape drive, a Zip drive, a flash memory card, a memory stick, and so on. Furthermore, the disk 1130 may be a compact disk read-only memory (CD-ROM) drive, a compact disk recordable (CD-R) drive, a compact disk rewritable (CD-RW) drive, a digital video disk read-only memory (DVD ROM), and so on. The memory 1110 can store a process 1140 and/or a data 1145, for example. The disk 1130 and/or the memory 1110 can store an operating system that controls and allocates resources of the computer 1100.

The bus 1120 may be a single internal bus interconnect architecture and/or other bus or mesh architectures. While a single bus is illustrated, it is appreciated that the computer 1100 may communicate with various devices, logics, and peripherals using other busses (e.g., peripheral component interconnect express (PCIE), 1394, universal serial bus (USB), Ethernet). The bus 1120 can be a variety of types including, for example, a memory bus, a memory controller, a peripheral bus, an external bus, a crossbar switch, and/or a local bus.

The computer 1100 may interact with input/output devices via the input/output (I/O) interfaces 1135 including the image decompression logic 1125 and the input/output ports 1115. Input/output devices may be, for example, a keyboard, a microphone, a pointing and selection device, cameras, video cards, displays, the disk 1130, the network devices 1150, and so on. The input/output ports 1115 may include, for example, serial ports, parallel ports, and USB ports.

The computer 1100 can operate in a network environment and thus may be connected to the network devices 1150 via the I/O interfaces 1135, and/or the I/O ports 1115. Through the network devices 1150, the computer 1100 may interact with a network. Through the network, the computer 1100 may be logically connected to remote computers. Networks with which the computer 1100 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    translation logic configured to store pixel data of a compressed image as a plurality of two-dimensional data blocks,
    wherein the translation logic is configured to re-organize the pixel data for each of the plurality of two dimensional data blocks into a series of back-to-back adjacent pixels that proceeds around a data block of the plurality of two-dimensional data blocks, and wherein the translation logic is configured to re-organize by converting addresses of the series of back-to-back adjacent pixels into a sequential string of continuous addresses in memory that are consecutive; and
    decompression logic configured to, at least partially, decompress the compressed image based, at least in part, on the plurality of two-dimensional data blocks.

2. The apparatus of claim 1, wherein the decompression logic is configured to at least partially decompress the compressed image by obtaining a motion vector based, at least in part, on one or more of the plurality of two-dimensional data blocks, and wherein the decompression logic is configured to compensate for motion between two frames of the compressed image based, at least in part, on the motion vector.

3. The apparatus of claim 1, wherein the translation logic is configured to combine two or more of the plurality of two-dimensional data blocks into one page of memory with adjacent back-to-back memory addresses, and wherein the translation logic is configured to re-organize the pixel data into a series of back-to-back adjacent pixels that proceeds around a data block of the plurality of two-dimensional data blocks by proceeding in a zig-zag pattern or a circular pattern around the data block.

4. The apparatus of claim 1, wherein the translation logic is configured to organize a two-dimensional data block to contain pixel data from at least two different lines of the pixel data, wherein the pixel data is rasterized pixel data of the compressed image, wherein the pixel data is initially stored as parallel lines of pixel data, and wherein the translation logic assigns pixel data in the two-dimensional data block to a continuous address space.

5. The apparatus of claim 4, wherein a two-dimensional array of two-dimensional data blocks is assigned to one continuous address space, wherein data blocks in the plurality of two-dimensional data blocks are asymmetric, and wherein data blocks in the plurality of two-dimensional data blocks span parallel lines of the pixel data.

6. The apparatus of claim 1, further comprising:
   memory access logic for storing one of the plurality of two-dimensional data blocks into a memory with a single memory transaction.

7. The apparatus of claim 1, further comprising:
   memory access logic for reading one or more two-dimensional data blocks from a memory in one memory transaction.

8. The apparatus of claim 1, wherein the apparatus is implemented in a silicon chip, wherein the silicon chip implements a system on a chip (SoC) with a processor, a bus, and a memory.

9. The apparatus of claim 1, wherein the translation logic is configured to convert addresses of the series of back-to-back adjacent pixels to a sequential string of continuous addresses in memory, wherein the series of back-to-back adjacent pixels circle around each of the plurality of two-dimensional data blocks, and wherein the translation logic is configured to re-organize pixel data for each of the plurality of two-dimensional data blocks to be stored in consecutive memory locations to permit reading each data block in one memory transaction.

10. An apparatus, comprising:
    mapping logic configured to re-organize addresses of pixel data from lines of pixels into a plurality of blocks for an image, wherein each of the plurality of blocks is a two-dimensional block that includes pixels from multiple parallel lines in the pixel data, wherein the mapping logic is configured to re-organize addresses for the pixel data by determining a sequence of adjacent pixels within blocks of the plurality of blocks that span parallel lines in the pixel data around each of the plurality of blocks, and remapping the sequence of adjacent pixels into a sequential string of continuous addresses in a line of memory; and
    image processing logic configured to at least partially decode or encode the image based, at least in part, on the plurality of tile blocks.

11. The apparatus of claim 10, wherein the image processing logic is configured to obtain at least one motion vector for the image based, at least in part, on one or more of the plurality of blocks, and wherein the image processing logic is configured to encode or decode the image based, at least in part, on the at least one motion vector.

12. The apparatus of claim 10, wherein the mapping logic is configured to map the plurality of blocks into a grid of non-overlapping tile blocks, and wherein one of the lines of pixel data is at least partially represented by two or more blocks, and wherein the mapping logic is configured to determine a sequence of adjacent pixels that span parallel lines in the pixel data by proceeding in a zig-zag pattern or a circular pattern around a block in the plurality of blocks.

13. The apparatus of claim 10, wherein the mapping logic is configured to group two or more of the plurality of blocks that are adjacent to one another into a group of tile blocks, and wherein the apparatus writes the group of tile blocks to one page of memory.

14. The apparatus of claim 10, wherein the apparatus is configured to write one whole block of the plurality of blocks to a memory in one memory transaction, wherein the apparatus is configured to read one whole block of the plurality of blocks from the memory in one memory transaction, wherein blocks in the plurality of blocks are asymmetric, and wherein the blocks in the plurality of blocks span parallel lines of the pixel data.

15. The apparatus of claim 10, wherein the mapping logic is configured to map pixel data from a block of the plurality of blocks to consecutive memory addresses.

16. A method, comprising:
    transforming, in a memory, lines of pixel data of an image into tiles of data, wherein a tile of the tiles includes pixels from two or more of the lines of pixel data,
    wherein transforming the lines of pixel data for the tile includes determining a sequence of adjacent pixels within the tile which spans parallel lines of the pixel data around the tile, and mapping the sequence of adjacent pixels into a sequential string of continuous addresses in the memory; and
    decoding the image using the image data in a format of the tiles of data to generate a decoded image.

17. The method of claim 16, wherein the at least partially decoding further comprises:
    obtaining a motion vector based, at least in part, on one or more of the tiles of data, and
    controlling the decoding of the image based, at least in part, on the motion vector.

18. The method of claim 16, wherein two or more of the tiles of pixel data are arranged as a grid of adjacent non-overlapping tiles of data, and wherein the tiles are asymmetric tiles that are two-dimensional.

19. The method of claim 18, further comprising:
    writing the grid of adjacent non-overlapping tiles of data to a single page of memory, wherein one tile of data is written to the single page of memory in one memory transaction.

20. The method of claim 16, wherein determining the sequence of adjacent pixels includes proceeding in a zig-zag pattern or a circular pattern around the tile to form the sequence.

* * * * *